United States Patent
Shi et al.

(10) Patent No.: US 9,706,584 B2
(45) Date of Patent: Jul. 11, 2017

(54) RESETTING OF NETWORK RESOURCES IN WIRELESS NETWORKS

(71) Applicant: TELEFONAKTIEBOLAGET L M ERICSSON (PUBL), Stockholm (SE)

(72) Inventors: Nianshan Shi, Järfälla (SE); Martin Israelsson, Spånga (SE); Jacques Salerian, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 14/420,938

(22) PCT Filed: Jan. 27, 2015

(86) PCT No.: PCT/SE2015/050075
§ 371 (c)(1),
(2) Date: Feb. 11, 2015

(87) PCT Pub. No.: WO2015/119558
PCT Pub. Date: Aug. 13, 2015

(65) Prior Publication Data
US 2016/0029418 A1    Jan. 28, 2016

Related U.S. Application Data

(60) Provisional application No. 61/937,766, filed on Feb. 10, 2014.

(51) Int. Cl.
*H04W 4/00* (2009.01)
*H04W 76/02* (2009.01)
*H04W 24/02* (2009.01)

(52) U.S. Cl.
CPC .......... *H04W 76/021* (2013.01); *H04W 24/02* (2013.01)

(58) Field of Classification Search
CPC combination set(s) only.
See application file for complete search history.

(56) References Cited

U.S. PATENT DOCUMENTS

| | | | |
|---|---|---|---|
| 7,715,837 B2 * | 5/2010 | Lehtovirta | H04W 24/00 370/352 |
| 8,107,951 B2 * | 1/2012 | Wallentin | H04W 76/062 370/328 |
| 8,737,970 B2 * | 5/2014 | Li | H04W 76/06 370/328 |

OTHER PUBLICATIONS

Ericsson. Enhance the RANAP Reset Resource Procedure. 3GPP TSG RAN WG3 Meeting #866. San Francisco, USA. R3-142934. Nov. 17-21, 2014.

(Continued)

*Primary Examiner* — Frank Duong

(57) ABSTRACT

The proposed technology relates to methods and network nodes for enabling resetting of network resources in a wireless network. For example, a method performed by a first network node comprises the step of providing at least one pair of information elements, each pair defining a respective range of identifiers within a list of identifiers, wherein each identifier within each range of identifiers is associated with a respective network resource to be reset.

22 Claims, 10 Drawing Sheets

(56) References Cited

OTHER PUBLICATIONS

3rd Generation Partnership Project; Technical Specification Group Radio Access Network; UTRAN lu interface Radio Access Network Application Part (RANAP) signaling (Release 12). 3GPP Standard; 3GPP TS 25.413, 3rd Generation Partnership Project (3GPP) , Mobile Competence Centre; 650, Route Des Lucioles; F-06921 Sophia-Antipolis Cedex, France, vol. RAN WG3, No. V12.0.0, Dec. 17, 2013.

Cisco. Corporate Headquarters Catalyst 2940 Switch Software Configuration Guide. Cisco IOS Release 12.1(19)EA1. Oct. 1, 2003.

* cited by examiner

RESETTING OF NETWORK RESOURCES IN WIRELESS NETWORKS

This application claims the benefit of U.S. Provisional Application No. 61/937,766, filed Feb. 10, 2014, the disclosure of which is fully incorporated herein by reference.

TECHNICAL FIELD

The proposed technology generally relates to enabling resetting of network resources in a wireless network.

BACKGROUND

The Global System for Mobile Communications (GSM) standard was developed as a replacement for first generation (1G) analogue cellular networks, and originally described a digital, circuit-switched network optimized for full duplex voice telephony. This was expanded over time to include data communications, first by circuit-switched transport, then packet data transport via General Packet Radio Services (GPRS) and Enhanced Data rates for GSM Evolution (EDGE) (or EGPRS).

Subsequently, the $3^{rd}$ Generation Partnership Project (3GPP) developed $3^{rd}$ Generation Wireless Mobile Communication Technology (3G) Universal Mobile Telecommunications System (UMTS) standards followed by fourth generation (4G) Long Time Evolution (LTE) Advanced standards.

The Universal Terrestrial Radio Access Network (UTRAN) is a collective term for the base stations, or Node B's, and Radio Network Controllers (RNCs) which make up the UMTS radio access network. This communications network, commonly referred to as 3G, can carry many traffic types from real-time Circuit Switched (CS) to IP based Packet Switched (PS). The UTRAN allows connectivity between the UE (user equipment) and the core network (CN).

The UTRAN contains the base stations, or Node Bs, and Radio Network Controllers (RNC). The RNC provides control functionalities for one or more Node Bs. The RNC and its corresponding Node Bs make up the Radio Network Subsystem (RNS). There can be more than one RNS present in a UTRAN.

There are four interfaces connecting the UTRAN internally or externally to other functional entities: Iu, Uu, Iub and Iur, see FIG. 1. The Iub is an internal interface connecting the RNC with the Node B. Also, there is the Iur interface which is an internal interface most of the time, but can, exceptionally, also be an external interface for some network architectures. The Iur connects two RNCs with each other.

The Uu interface is an external interface connecting the Node B with the User Equipment (UE). The Iu interface is also external and connects the RNC to the Core Network (CN). The IuCS interface in FIG. 1 carries the CS traffic types and the IuPS interface carries the PS traffic types. The Iu interface in 3G corresponds to the A interface between the Mobile Switching Center (MSC) and the Base Station Controller (BSC) in GSM.

Across the Iu interface, the Iu general control services and the Iu notification services are implemented. The general control services are services related to the whole Iu interface instance between the RNC and CN. For instance, the Reset procedure used to initialize the UTRAN in the event of a failure in the CN or vice versa, is one of the procedures used to implement the general control services.

The Radio Access Network Application Part (RANAP) protocol is used in UMTS for signalling between the CN and the UTRAN over the Iu interface. The RANAP signalling protocol resides in the control plane of the Radio network layer of the Iu interface in the UMTS protocol stack.

In the event of a failure at the UTRAN which has resulted in the loss of transaction reference information, a RANAP RESET message is sent to the CN. This message is used by the CN to release affected Radio Access Bearers and erase all affected references. After a guard period a RESET ACKNOWLEDGE message is returned to the UTRAN indicating that all references have been cleared.

Correspondingly, in the event of a failure at the CN which has resulted in the loss of transaction reference information, a RANAP RESET message is sent to the RNC. This message is used by the UTRAN to release affected Radio Access Bearers and erase all affected references. After a guard period a RESET ACKNOWLEDGE message is returned to the CN, indicating that all Ues which were involved in a call are no longer transmitting and that all references at the UTRAN have been cleared.

Resources related to a specific UE in UTRAN and CN are controlled over the Iu interface by utilising the Iu signalling connection. In case this signalling connection is abnormally released, there has to be a mechanism to reset the resources that were previously controlled by the abnormally released Iu signalling connection.

One possible way to realise this functionality is to rely on indication from the Iu signalling connection itself, which would tell the user of the signalling connection that an error having resulted to an abnormal release of the signalling connection has occurred.

To maintain the independency between transport and radio network layers an explicit RANAP procedure Reset Resource has been introduced. The purpose of the Reset Resource procedure is to restore the information in CN/UTRAN in the case of a failure which has affected only a small part of the equipment (e.g. abnormal Iu signalling connection release, or resource hanging).

If a resource has to be put to idle at the UTRAN due to an abnormal Iu signalling connection release, a RESET RESOURCE message shall be sent to CN. When CN receives this message, it clears all the resources (if any) used for the indicated resources to be reset and returns RESET RESOURCE ACKNOWLEDGE message to UTRAN.

Correspondingly, if a resource has to be put to idle at CN due to an abnormal release of Iu signalling connection, a RESET RESOURCE message will be sent to the UTRAN. When RNC receives a RESET RESOURCE message, it shall respond with a RESET RESOURCE ACKNOWLEDGE message and release all UTRAN resources (if any) associated to the indicated resource to be reset.

Thanks to the development of the Universal Terrestrial Radio Access Network (UTRAN) system, the RNC has become more and more scalable. The mega RNC has been developed to manage large metropolitan Universal Mobile Telecommunications System (UMTS) networks so the capacity of the RNC in terms of number of connected User Equipment (UEs) has been increased dramatically.

Since the networks have evolved to handle more and more users, the current procedures for resetting network resources encounter capacity problems, for example message congestion and/or latency in the reset procedures. The problems are not limited to 3G, but are also present in other wireless networks, such as for example GSM.

Thus, there is a general need of a more efficient procedure for resetting network resources in wireless networks.

SUMMARY

It is an object to provide methods and network nodes for resetting of network resources in a wireless network.

This and other objects are met by embodiments of the proposed technology.

An aspect of the embodiments relates to a method performed by a first network node for enabling resetting of network resources in a wireless network. The method comprises the step of providing at least one pair of information elements, each pair defining a respective range of identifiers within a list of identifiers, wherein each identifier within each range of identifiers is associated with a respective network resource to be reset.

Another aspect of the embodiments relates to a method performed by a second network node for enabling resetting of network resources in a wireless network. The method comprises the step of receiving at least one pair of information elements, each pair defining a respective range of identifiers within a list of identifiers, wherein each identifier within each range of identifiers is associated with a respective network resource to be reset.

Yet another aspect of the embodiments relates to a first network node configured to enable resetting of network resources in a wireless network. The first network node is configured to provide at least one pair of information elements, each pair defining a respective range of identifiers within a list of identifiers, wherein each identifier within each range of identifiers is associated with a respective network resource to be reset.

Yet another aspect of the embodiments relates to a first network node for enabling resetting of network resources in a wireless network. The first network node comprises a providing module for providing at least one pair of information elements, each pair defining a respective range of identifiers within a list of identifiers, wherein each identifier within each range of identifiers is associated with a respective network resource to be reset.

Yet another aspect of the embodiments relates to a second network node configured to enable resetting of network resources in a wireless network. The second network node is configured to receive at least one pair of information elements, each pair defining a respective range of identifiers within a list of identifiers, wherein each identifier within each range of identifiers is associated with a respective network resource to be reset.

Yet another aspect of the embodiments relates to a second network node for enabling resetting of network resources in a wireless network. The second network node comprises an obtaining module for obtaining at least one pair of information elements, each pair defining a respective range of identifiers within a list of identifiers, wherein each identifier within each range of identifiers is associated with a respective network resource to be reset.

Yet another aspect of the embodiments relates to a computer program comprising instructions, which when executed by at least one processor, cause the processor or processors to provide at least one pair of information elements, each pair defining a respective range of identifiers within a list of identifiers, wherein each identifier within each range of identifiers is associated with a respective network resource to be reset.

Yet another aspect of the embodiments relates to a computer program comprising instructions, which when executed by at least one processor, cause the processor or processors to obtain at least one pair of information elements, each pair defining a respective range of identifiers within a list of identifiers, wherein each identifier within each range of identifiers is associated with a respective network resource to be reset.

Yet another aspect of the embodiments relates to a carrier comprising any of the above computer programs, wherein the carrier is one of an electronic signal, an optical signal, an electromagnetic signal, a magnetic signal, an electric signal, a radio signal, a microwave signal, or a computer-readable storage medium.

An advantage of the proposed solution is that the UTRAN or other Radio Access Network (RAN) could be at least partially reset without the reset procedure being delayed, or the network interface being congested.

Another advantage of the proposed solution is that the message used for initializing the reset procedure could be very slim.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
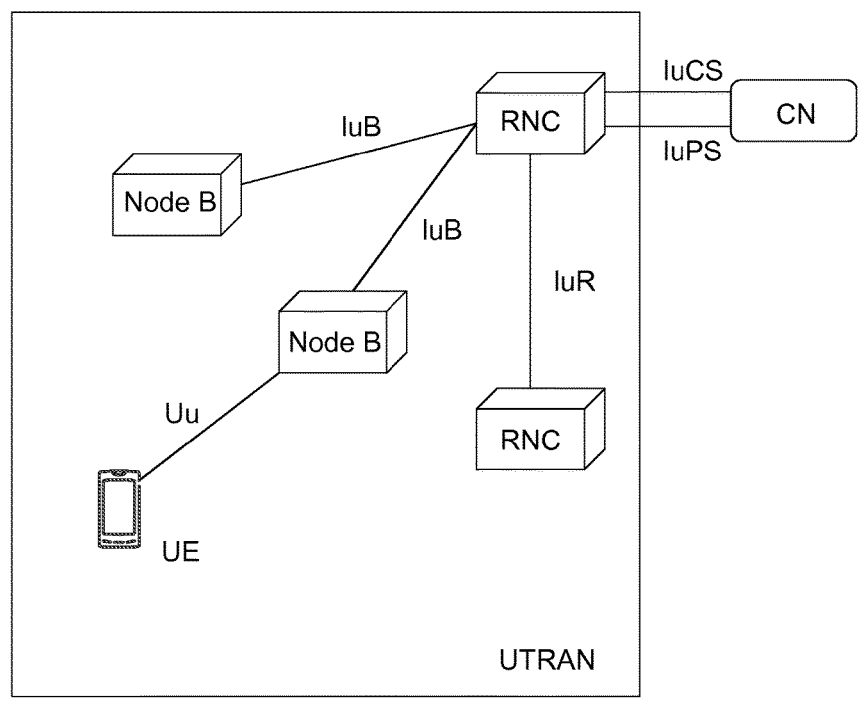
FIG. 1 is a schematic illustration of the architecture of a Universal Terrestrial Radio Access Network (UTRAN).

Throughout the drawings, the same reference numbers are used for similar or corresponding elements.

Although the proposed technology will be described mainly in the context of a 3G network, it may possibly also be implemented within other communication systems, such as for example the Global System for Mobile Communications, GSM.

As described in the background section, in the case there is an abnormal failure, such as resource hanging, in the signalling connection over a network interface, such as the Iu interface in a 3G network, a reset or partial reset of the network resources should be performed.

In the current 3$^{rd}$ Generation Partnership Project (3GPP) specification, there are two types of reset procedures over the Iu interface; the Reset Procedure and the Reset Resource Procedure. When sent from the RNC to the CN, the Reset Procedure is used by the CN to release affected Radio Access Bearers and to erase all affected references for the sending RNC. The Reset Resource Procedure, when sent from the RNC to the CN, is used to indicate to the CN that it shall locally release the resources and references (such as resources and Iu signalling connection identifiers) associated with the Iu signalling connection identifiers indicated in the received message. In the Reset Resource message, a list of Iu Signalling Connection Identifier Information Elements (IEs) is included, where each Iu Signalling Connection Identifier uniquely identifies an Iu signalling connection between a given RNC and a given CN node.

Thanks to the development of the Universal Terrestrial Radio Access Network (UTRAN) system, the RNC has become more and more scalable. The mega RNC has been developed to manage large metropolitan Universal Mobile Telecommunications System (UMTS) networks so the capacity of the RNC in terms of number of connected User Equipment (UEs) has been increased dramatically. In 3GPP Rel. 11, the maximum size of the Serving RNC Radio Network Temporary Identifier (S-RNTI) identity was extended from 20 bits to 22 bits to enable an RNC to handle more active UEs.

The actual implementation of a mega RNC is vendor-specific, but possible implementations are for example a pool of RNCs, or a set of RNC modules. With this type of implementations the Reset Procedure will not be used if only a part of the Iu interfaces for mega RNC needs to be reset, since the Reset Procedure would affect all Iu interfaces for the whole mega RNC. The current Reset Resource Procedure would be more suitable for this purpose since it can be used to reset a part of the Iu interfaces. However, since the network has evolved to handle more and more users, it would probably be necessary to reset hundreds and thousands of Iu Signalling Connection Identifiers, which could become problematic (e.g. problems with RANAP congestion, or latency in the RNC reset). Currently the Iu Signalling Connection Identifier IE is defined as 24 bits, and the maximum number of Iu Signalling Connection Identifiers in one message is 250. Sending 250 Iu Signalling Connection Identifiers, each costing 24 bits, would result in a huge RANAP message. Sending many Reset Resource messages in order to do a partial reset could make the situation even worse.

Similar problems are encountered also in other wireless networks.

Thus, there is a general need of a more efficient procedure for resetting network resources in wireless networks.

In particular, there is a need to improve the RANAP efficiency in 3G networks.

Figure 4:
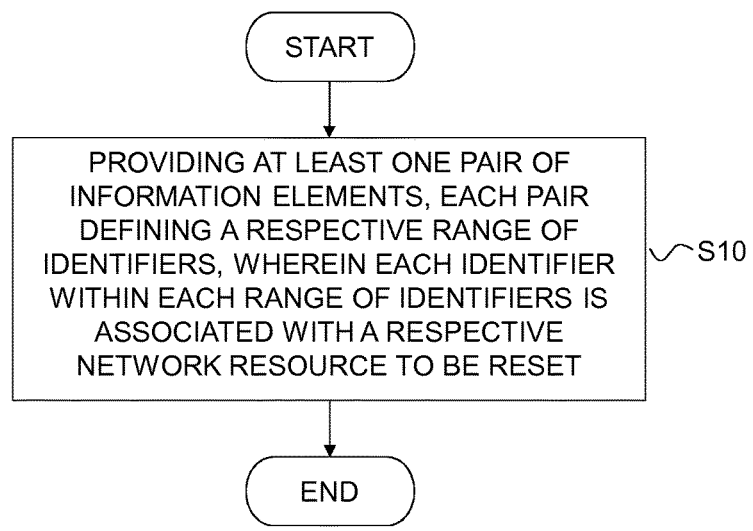
FIG. 4 is a schematic flow diagram illustrating an example of a method performed by a first network node for enabling resetting of network resources in a wireless network according to an embodiment.

FIG. 4 is a schematic flow diagram illustrating an example of a method performed by a first network node for enabling resetting of network resources in a wireless network. The method comprises the step S10 of providing at least one pair of information elements, each pair defining a respective range of identifiers within a list of identifiers, wherein each identifier within each range of identifiers is associated with a respective network resource to be reset.

In an example embodiment, the length of each range of identifiers is greater than two.

In one embodiment, one information element of a pair of information elements indicates a starting point of a range of identifiers within a list of identifiers, and the other information element of the same pair of information elements indicates an end point of the same range of identifiers. In an alternative embodiment, one information element of a pair of information elements indicates a starting point or and end point of a range of identifiers within a list of identifiers, and the other information element of the same pair of information elements indicates a length of the same range of identifiers.

Figure 5:
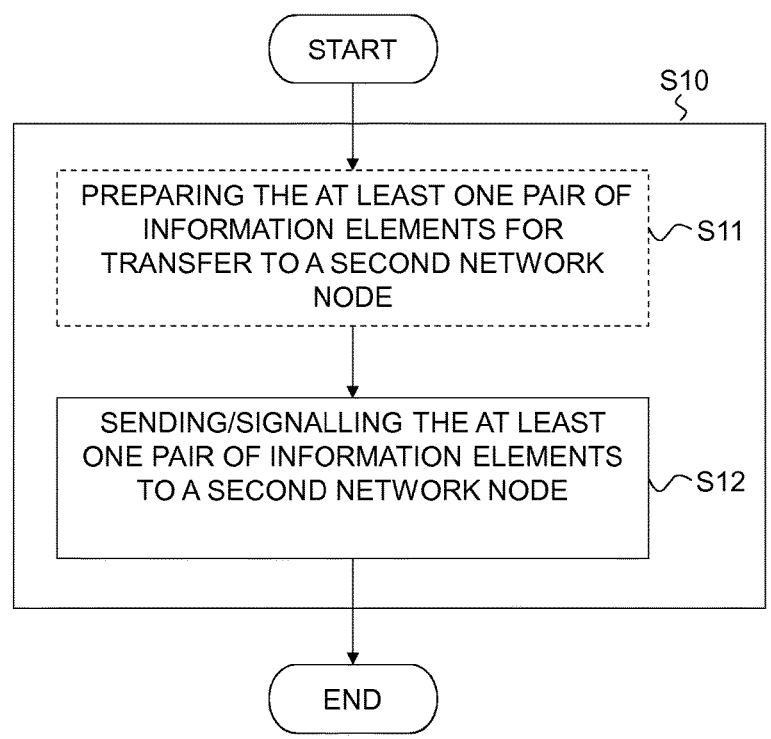
FIG. 5 is a schematic flow diagram illustrating an example of the providing step of FIG. 4 according to an embodiment.

FIG. 5 is a schematic flow diagram illustrating an example of the providing step S10 of FIG. 4 according to an embodiment. In this example, the step S10 of providing at least one pair of information elements comprises the optional step S11 (illustrated with dashed lines) of preparing the at least one pair of information elements for transfer to the second network node, and the step S12 of sending or signalling the at least one pair of information elements to a second network node.

The identifiers may in an example embodiment comprise network interface Signalling Connection Identifiers.

In an embodiment, the at least one pair of information elements is provided in a Radio Access Network Application Part, RANAP, message. In a particular embodiment, the information elements correspond to standardized Information Elements, IEs, such as Iu Signalling Connection Identifier IEs.

In another particular embodiment, the at least one pair of information elements is provided in a RESET RESOURCE message within a RANAP Reset Resource procedure (see an example of an implementation in Table A below).

Figure 6:
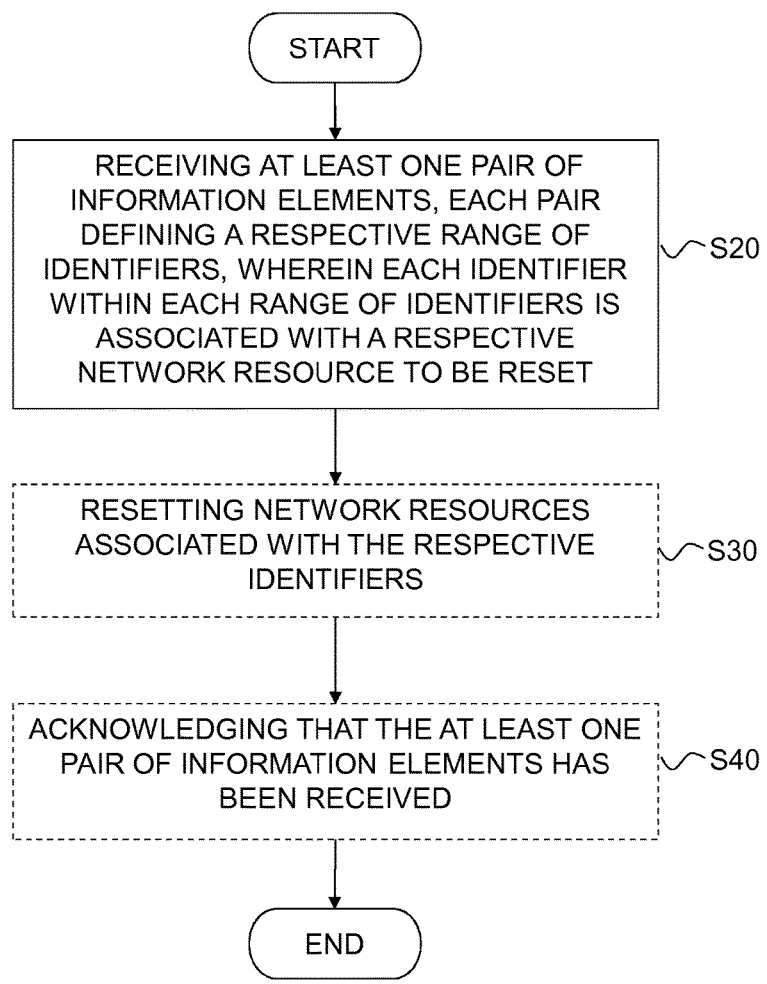
FIG. 6 is a schematic flow diagram illustrating an example of a method performed by a second network node for enabling resetting of network resources in a wireless network according to an embodiment.

FIG. 6 is a schematic flow diagram illustrating an example of a method performed by a second network node for enabling resetting of network resources in a wireless network according to an embodiment. The method comprises the step S20 of receiving at least one pair of information elements, each pair defining a respective range of identifiers within a list of identifiers, wherein each identifier within each range of identifiers is associated with a respective network resource to be reset.

In an example embodiment, the length of each range of identifiers is greater than two.

In a particular embodiment, the method further comprises the optional step S30 of resetting each network resource associated with a respective identifier within each range of identifiers defined by a respective received pair of information elements. The step S30 is illustrated with dashed lines in FIG. 6.

In another particular embodiment, the method further comprises the optional step S40 of acknowledging that the at least one pair of information elements has been received. The step S40 is illustrated with dashed lines in FIG. 6.

In a particular example embodiment, the step S40 of acknowledging that the at least one pair of information elements has been received comprises the step of sending a Radio Access Network Application Part, RANAP, message to the first network node.

In another particular example embodiment, the step S40 of acknowledging that the at least one pair of information elements has been received comprises the step of sending a RESET RESOURCE ACKNOWLEDGE message within a RANAP Reset Resource Acknowledge procedure to the first network node.

In one embodiment, the first network node is a Radio Network Controller, RNC, and the second network node is a Core Network node, CN node. In an alternative embodiment, the first network node is a Core Network node, CN node, and the second network node is a Radio Network Controller, RNC.

Figure 2:
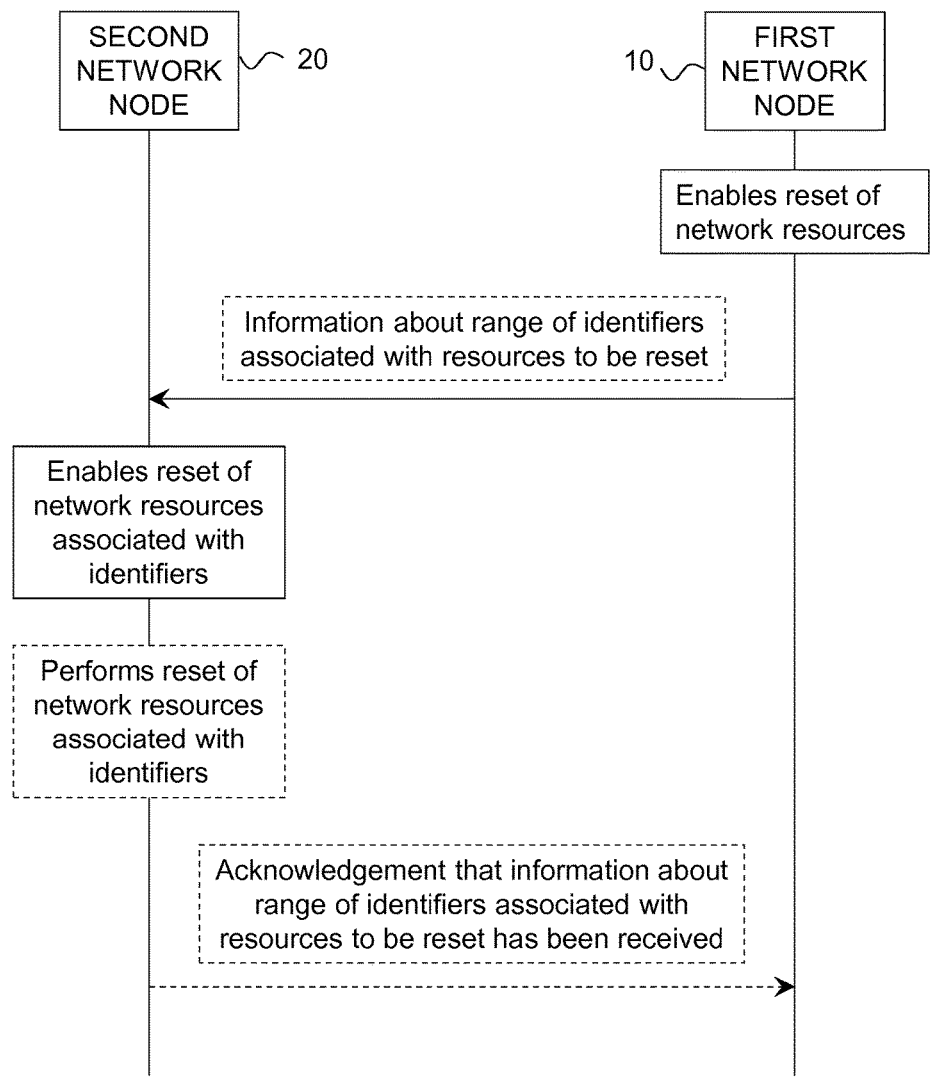
FIG. 2 is a schematic diagram illustrating an example of signalling and/or actions between a first network node and a second network node according to an embodiment.

FIG. 2 is a schematic diagram illustrating an example of signalling and/or actions between a first network node 10 and a second network node 20 according to an embodiment. By way of example, when it has been decided that at least a partial reset of the network resources should be performed, the first network node 10 enables reset of network resources by sending information about a range of identifiers associated with the resources to be reset to the second network node 20. The second network node 20 receives the information and enables reset of networks resources associated with the identifiers. In a particular embodiment the second network node 20 also sends an acknowledgement to the first network node 10 that the information has been received. In one embodiment the second network 20 also performs reset of the network resources associated with the identifiers. In an alternative embodiment the reset may be performed by another network node.

Using the above presented solution, the UTRAN or other Radio Access Network (RAN) could be at least partially reset without the reset procedure being delayed, or the network interface being congested.

In particular, the message used for initializing the reset procedure could be very slim.

In the following, some non-limiting examples of illustrative embodiments are described.

The proposed technology provides a method to reset a part or parts of the resources in a very short message. Instead of sending a list of individual Iu Signalling Connection Identifiers to be reset, in one embodiment the RNC sends a list of pairs of Iu Signalling Connection Identifiers to the CN, where the two values in each pair represent a range of Iu Signalling Connection Identifiers for the resources to be reset. The two values in each pair could for example represent the start and the end of a range of Iu Signalling Connection Identifiers, or the start and the length of such a range, or the end and the length of such a range.

In another embodiment individual and pairs of Iu Signalling Connection Identifiers are mixed in the list.

A mega RNC may in one embodiment be implemented for example via a pool of RNCs, or in another embodiment via a set of modules, or any other technique in yet another embodiment. The mega RNC will in one embodiment apply an implementation-dependent logic during the establishment of an Iu signalling connection between the RNC and a CN domain so that the allocated Iu Signalling Connection Identifier value is related to the physical sub-part of the mega RNC that will handle the particular Iu connection.

In such cases when only certain nodes in the RNC pool, or certain modules in the RNC, or corresponding, should be reset, the RNC in one embodiment provides the range of resource identifiers, for example by providing the start and end of the range of Iu Signalling Connection Identifiers in a very short message. Table A and Table B show an example of such an implementation.

In an alternative embodiment, the start and the length of the range of Iu Signalling Connection Identifiers could be provided. In yet another alternative embodiment, the end and the length of the range of Iu Signalling Connection Identifiers could be provided.

In one embodiment the CN understands that all the Iu Signalling Connection Identifiers in the range should be reset. In a particular embodiment the CN skips all unknown identifiers. In another particular embodiment the CN then sends back an acknowledgement.

Figure 3:
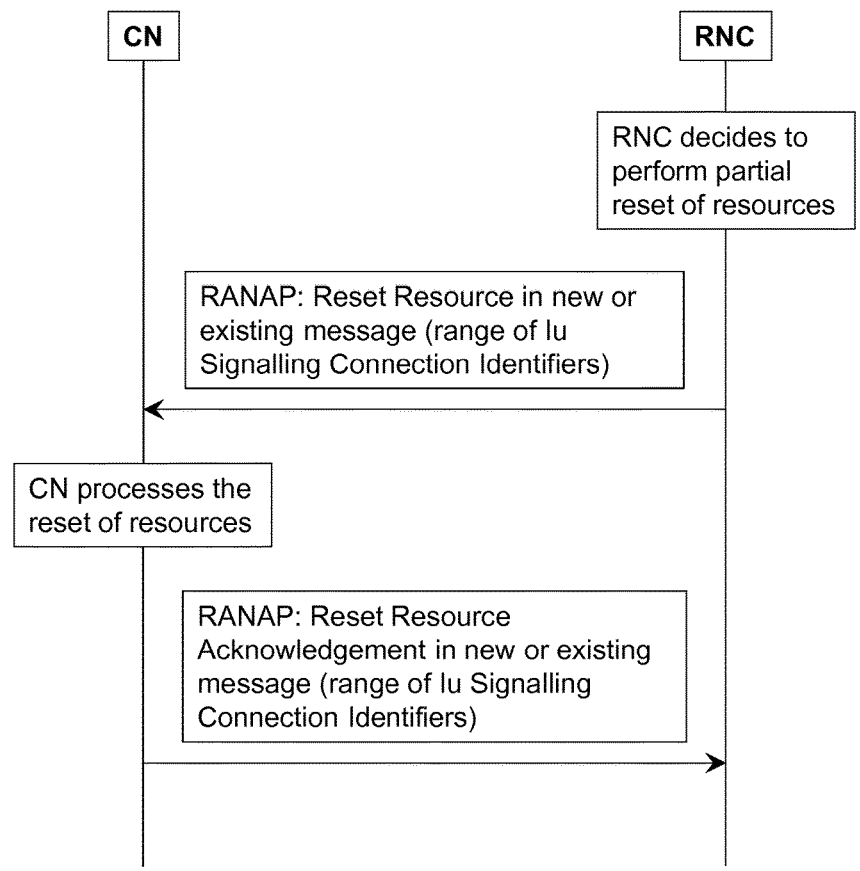
FIG. 3 is a schematic diagram illustrating a particular example of signalling and/or actions for an RNC and a CN according to a particular embodiment.

FIG. 3 shows a schematic signalling diagram illustrating the communication between RNC and CN according to one example embodiment.

In a particular embodiment the RNC sends a list of ranges.

The solution could in one embodiment be implemented by introducing a new RANAP message, or in another embodiment by modifying a RANAP message already existing in the standard [1].

In an alternative embodiment, the solution could possibly be implemented in a "User Plane" message.

In an example embodiment, the solution is implemented in the RANAP Reset Resource message already existing in the standard [1]. In an alternative example embodiment, the solution could be implemented in the existing RANAP Reset message, or in another suitable RANAP message.

Using the above presented solution, the mega RNC can be reset partially without the reset procedure being delayed, or the RANAP interface being congested.

With the use of a good logic to arrange the Iu Signalling Connection Identifiers in the RNC, the partial reset message could be very slim.

Table A shows an example of a modified definition of a standard [1] RANAP RESET RESOURCE message according to an embodiment. The proposed changes are shown in the cells marked with bold borders. In this example, the new IE "Iu Sig Conn Id Range End" is introduced in the existing "Reset Resource List". A new IE carrying similar information could also be defined in other positions.

entity to release resources and references associated to the Iu signalling connection identifiers of the message.

Direction: RNC→CN and CN→RNC. Signalling bearer mode: Connectionless.

TABLE A

A modified RESET RESOURCE message according to an embodiment.
The proposed changes are shown in the marked cells.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| CN Domain Indicator | M | | 9.2.1.5 | | YES | reject |
| Cause | M | | 9.2.1.4 | | YES | ignore |
| Reset Resource List | M | | | | YES | ignore |
| >Reset Resource Item IEs | | 0 to <maxnoofIuSidConIds> | | | EACH | reject |
| >>Iu Signalling Connection Identifier | M | | 9.2.1.38 | Contains start of range if Iu Sig Conn Id Range End is also included. | - | |
| >>Iu Sig Conn Id Range End | O | | Iu Signalling Connection Identifier 9.2.1.38 | Contains end of range when included. | YES | reject |
| Global RNC-ID | O | | 9.2.1.39 | If the Extended RNC-ID IE is included in the message, the RNC-ID IE in the Global RNC-ID IE shall be ignored. | YES | ignore |
| Global CN-ID | O | | 9.2.1.46 | | YES | ignore |
| Extended RNC-ID | O | | 9.2.1.39a | The Extended RNC-ID IE shall be used if the RNC identity has a value larger than 4095. | YES | reject |

| Range bound | Explanation |
|---|---|
| maxnoofIuSigConIds | Maximum no. of Iu signalling connection identifiers. Value is 250. |

In the example implementation shown in Table A the existing IE "Iu Signalling Connection Identifier" is used as a start of the range of Iu Signalling Connection Identifiers to be reset, for the case that the new IE "Iu Sig Conn Id Range End" is included in the message. Hence, an existing IE is "re-used" but given another meaning. Of course, in another implementation it would also be possible to introduce a new IE for the start of the range as well as for the end of the range without re-using any existing IEs. Other implementations are of course also possible. Also, as described above, the length of the range could be provided as an alternative to the start/end.

The message is sent by either the CN in one embodiment or the RNC in another embodiment. The sending entity informs the receiving entity that it requests the receiving The maximum number of Iu signalling connection identifiers contained in the RESET RESOURCE message shall not exceed the range bound specified for the maxnoofIuSigConIds (maximum number of Iu signalling connection identifiers) as indicated in the table above.

Table B shows a similar modification introduced in the standard [1] RESET RESOURCE ACKNOWLEDGE message according to an embodiment. The proposed changes are shown in the cells marked with bold borders. The message is sent by either the CN in one embodiment or the RNC in another embodiment to inform the RNCE or the CN that the RESET RESOURCE message has been received.

Direction: RNC→CN and CN→RNC. Signalling bearer mode: Connectionless.

TABLE B

A modified RESET RESOURCE ACKNOWLEDGE message according to an embodiment. The proposed changes are shown in the marked cells.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| CN Domain Indicator | M | | 9.2.1.5 | | YES | reject |
| Reset Resource List | M | | | | YES | ignore |
| >Reset Resource Item IEs | | 1 to <maxnoofIuSidConIds> | | This list shall be in the same order as the list received in the RESET RESOURCE message. | EACH | reject |
| >>Iu Signalling Connection Identifier | M | | 9.2.1.38 | Contains start of range if Iu Sig Conn Id Range End is also included. | - | |
| >>Iu Sig Conn Id Range End | O | | Iu Signalling Connection Identifier 9.2.1.38 | Contains end of range when included. | YES | reject |
| Global RNC-ID | O | | 9.2.1.39 | If the Extended RNC-ID IE is included in the message, the RNC-ID IE in the Global RNC-ID IE shall be ignored. | YES | ignore |
| Criticality Diagnostics | O | | 9.2.1.35 | | YES | ignore |
| Global CN-ID | O | | 9.2.1.46 | | YES | ignore |
| Extended RNC-ID | O | | 9.2.1.39a | The Extended RNC-ID IE shall be used if the RNC identity has a value larger than 4095. | YES | reject |

| Range bound | Explanation |
|---|---|
| maxnoofIuSigConIds | Maximum no. of Iu signalling connection identifiers. Value is 250. |

In an example of an implementation, at least some of the steps, functions, procedures, modules and/or blocks described herein are implemented in a computer program, which is loaded into a memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

Figure 7:
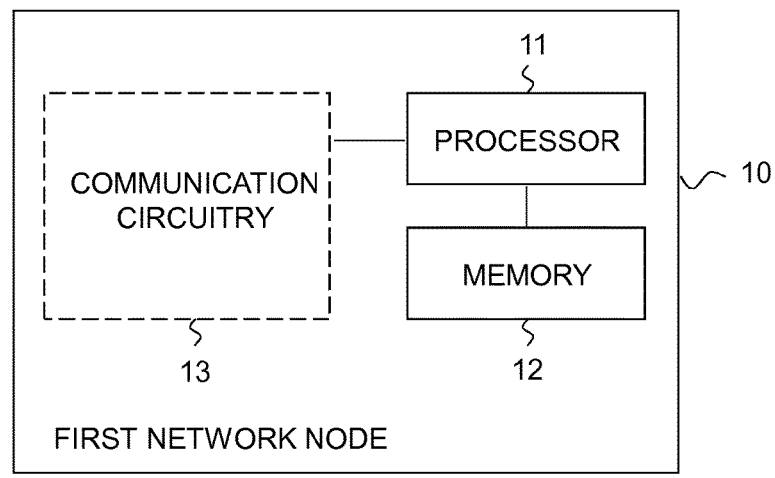
FIG. 7 is a schematic diagram illustrating an example of a first network node configured to enable resetting of network resources in a wireless network according to an embodiment.
Figure 8:
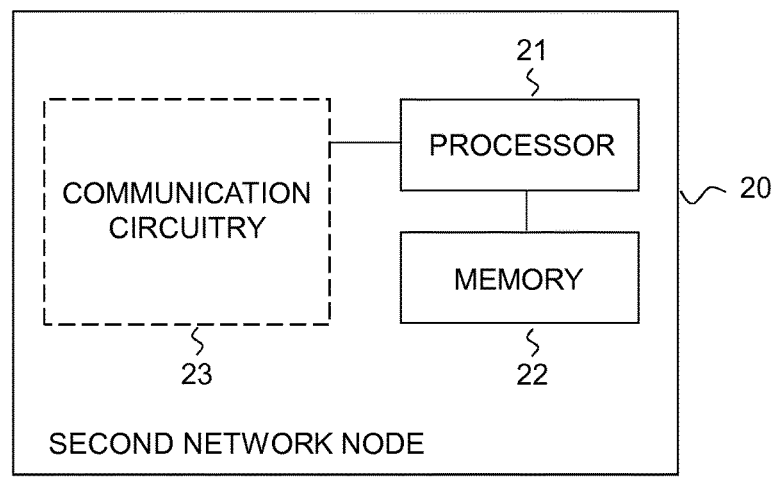
FIG. 8 is a schematic diagram illustrating an example of a second network node configured to enable resetting of network resources in a wireless network according to an embodiment.

The embodiments herein may thus be implemented through one or more processors, such as a respective processor in the network nodes depicted in FIGS. 7 and 8, together with respective computer program code for performing the functions and actions of the embodiments herein.

First Network Node

According to an example embodiment, a first network node is configured to enable resetting of network resources in a wireless network. The first network node is configured to provide at least one pair of information elements, each pair defining a respective range of identifiers within a list of identifiers, wherein each identifier within each range of identifiers is associated with a respective network resource to be reset.

In an example embodiment, the length of each range of identifiers is greater than two.

In one embodiment, one information element of a pair of information elements indicates a starting point of a range of identifiers within a list of identifiers, and the other information element of the same pair of information elements indicates an end point of the same range of identifiers. In an alternative embodiment, one information element of a pair of information elements indicates a starting point or and end point of a range of identifiers within a list of identifiers, and the other information element of the same pair of information elements indicates a length of the same range of identifiers.

In one embodiment, the first network node is configured to prepare the at least one pair of information elements for transfer to a second network node, and to send or signal the at least one pair of information elements to the second network node.

In an example embodiment, the identifiers comprise network interface Signalling Connection Identifiers.

In an embodiment, the first network node is configured to provide the at least one pair of information elements in a Radio Access Network Application Part, RANAP, message. In a particular embodiment, the information elements correspond to standardized Information Elements, IEs, such as Iu Signalling Connection Identifier IEs.

In another particular embodiment, the first network node is configured to provide the at least one pair of information elements in a RESET RESOURCE message within a RANAP Reset Resource procedure.

In one embodiment, the first network node is a Radio Network Controller, RNC. In an alternative embodiment, the first network node is a Core Network node, CN node.

FIG. 7 is a schematic diagram illustrating an example of a first network node 10 operative to enable resetting of network resources in a wireless network according to an embodiment. In this example, the first network node 10 basically comprises a processor 11, an associated memory 12 and optional communication circuitry 13. The optional communication circuitry 13 is adapted for wireless and/or wired communication with one or more other nodes, including transmitting and/or receiving information.

As indicated in the specific example of FIG. 7, the first network node 10 comprises a processor 11 and a memory 12, wherein the memory 12 comprises instructions executable by the processor 11 to perform operations of the first network node 10. Thus, in this example embodiment the processor 11 is operative to provide at least one pair of information elements, each pair defining a respective range of identifiers within a list of identifiers, wherein each identifier within each range of identifiers is associated with a respective network resource to be reset.

In a particular example embodiment the processor 11 is operative to prepare the at least one pair of information elements for transfer to a second network node.

As indicated in FIG. 7, the first network node 10 may also include communication circuitry 13 for communication with one or more other nodes, including transmitting and/or receiving information. Thus, in a particular embodiment the first network node comprises communication circuitry 13 configured to send the at least one pair of information elements to the second network node.

Second Network Node

According to an example embodiment, a second network node is configured to enable resetting of network resources in a wireless network. The second network node is configured to receive at least one pair of information elements, each pair defining a respective range of identifiers within a list of identifiers, wherein each identifier within each range of identifiers is associated with a respective network resource to be reset.

In an example embodiment, the length of each range of identifiers is greater than two.

In a particular embodiment, the second network node is further configured to reset each network resource associated with a respective identifier within each range of identifiers defined by a respective received pair of information elements.

In another particular embodiment, the second network node is further configured to acknowledge that the at least one pair of information elements has been received.

In a particular example embodiment, the second network node is configured to send a Radio Access Network Application Part, RANAP message to the first network node, to acknowledge that the at least one pair of information elements has been received.

In another particular example embodiment, the second network node is configured to send a RESET RESOURCE ACKNOWLEDGE message within a RANAP Reset Resource Acknowledge procedure to the first network node, to acknowledge that the at least one pair of information elements has been received.

In one embodiment, the second network node is a Core Network node, CN node. In an alternative embodiment, the second network node is a Radio Network Controller, RNC.

FIG. 8 is a schematic diagram illustrating an example of a second network node 20 operative to enable resetting of network resources in a wireless network according to an embodiment. In this example, the second network node 20 basically comprises a processor 21, an associated memory 22 and optional communication circuitry 23. The optional communication circuitry 23 is adapted for wireless and/or wired communication with one or more other nodes, including transmitting and/or receiving information.

As indicated in the specific example of FIG. 8, the second network node 20 comprises a processor 21 and a memory 22, wherein the memory 22 comprises instructions executable by the processor 21 to perform operations of the second network node 20. Thus, in this example embodiment the processor 21 is operative to obtain at least one pair of information elements, each pair defining a respective range of identifiers within a list of identifiers, wherein each identifier within each range of identifiers is associated with a respective network resource to be reset.

In a particular embodiment the processor 21 is further operative to reset each network resource associated with a respective identifier within each range of identifiers defined by a respective received pair of information elements.

In another particular embodiment the processor 21 is further operative to prepare an acknowledgement that the at least one pair of information elements has been received.

As indicated in FIG. 8, the second network node 20 may also include communication circuitry 23 for communication with one or more other nodes, including transmitting and/or receiving information. Thus, in a particular embodiment the second network node 20 comprises communication circuitry 23 configured to receive at least one pair of information elements, each pair defining a respective range of identifiers within a list of identifiers, wherein each identifier within each range of identifiers is associated with a respective network resource to be reset.

In another particular embodiment the communication circuitry 23 is further configured to send an acknowledgement that the at least one pair of information elements has been received.

As described above, at least some of the steps, functions, procedures, modules and/or blocks described above may be implemented in software such as a computer program for execution by suitable processing circuitry including one or more processing units. Examples of such implementations are schematically illustrated in FIGS. 9 and 10.

Figure 9:
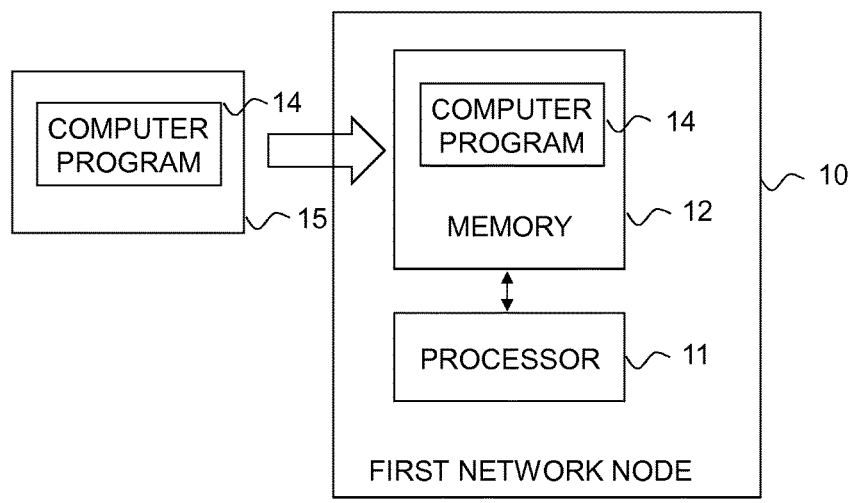
FIG. 9 is a schematic diagram illustrating an example of a first network node operative to enable resetting of network resources in a wireless network according to an alternative embodiment.

According to an embodiment, schematically illustrated in FIG. 9, a computer program 14 comprises instructions, which when executed by at least one processor 11, cause the processor(s) to provide at least one pair of information elements, each pair defining a respective range of identifiers within a list of identifiers, wherein each identifier within each range of identifiers is associated with a respective network resource to be reset.

Figure 10:
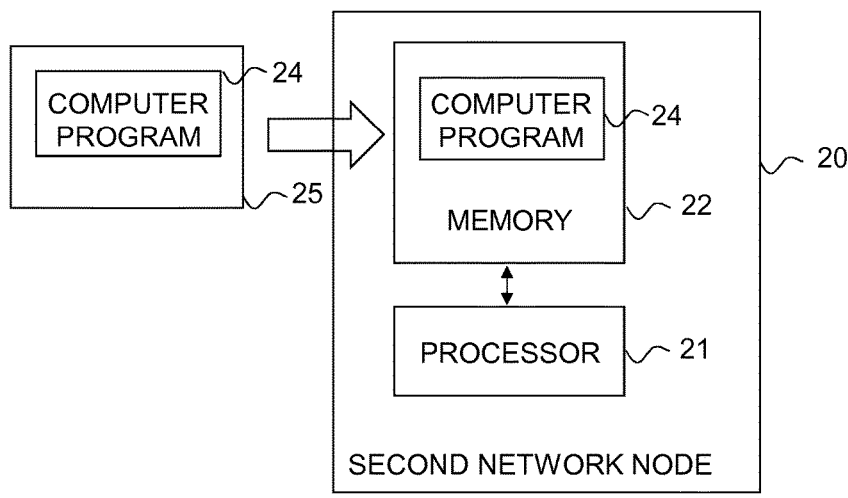
FIG. 10 is a schematic diagram illustrating an example of a second network node operative to enable resetting of network resources in a wireless network according to an alternative embodiment.

According to another embodiment, schematically illustrated in FIG. 10, a computer program 24 comprises instructions, which when executed by at least one processor 21, cause the processor(s) to obtain at least one pair of information elements, each pair defining a respective range of identifiers within a list of identifiers, wherein each identifier within each range of identifiers is associated with a respective network resource to be reset.

In a particular embodiment, the computer program 24 comprises instructions, which when executed by the at least one processor 21, further cause the processor(s) to reset each network resource associated with a respective identifier within each range of identifiers defined by a respective received pair of information elements.

In another particular embodiment, the computer program 24 comprises instructions, which when executed by the at least one processor 21, further cause the processor or processors to prepare an acknowledgement that the at least one pair of information elements has been received.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology thus also provides a carrier 15; 25, illustrated in FIGS. 9 and 10, and comprising one or more of the above computer programs 14; 24, wherein the carrier is one of an electronic signal, an optical signal, an electromagnetic signal, a magnetic signal, an electric signal, a radio signal, a microwave signal, or a computer-readable storage medium.

The flow diagram or diagrams presented above may be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network nodes may alternatively be defined as a group of function modules, where the function modules are implemented as a computer program running on at least one processor.

Hence, the computer program residing in memory may be organized as appropriate function modules configured to perform, when executed by the processor, at least part of the steps and/or tasks described herein. Examples of such function modules are illustrated in FIGS. 11-14.

Figure 11:
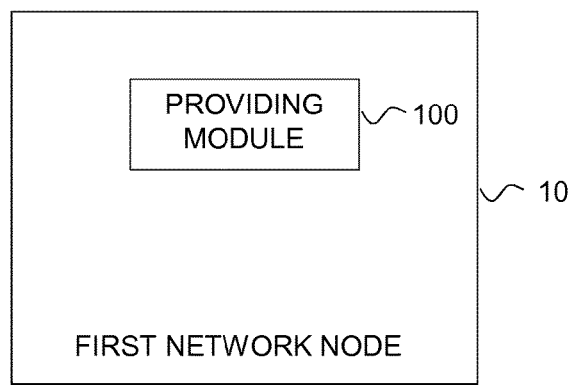
FIG. 11 is a schematic block diagram illustrating an example of a first network node for enabling resetting of network resources in a wireless network according to an alternative embodiment.

FIG. 11 is a schematic block diagram illustrating an example of a first network node 10 for enabling resetting of network resources in a wireless network according to an embodiment. In this example, the first network node 10 comprises a providing module 100 for providing at least one pair of information elements, each pair defining a respective range of identifiers within a list of identifiers, wherein each identifier within each range of identifiers is associated with a respective network resource to be reset.

Figure 12:
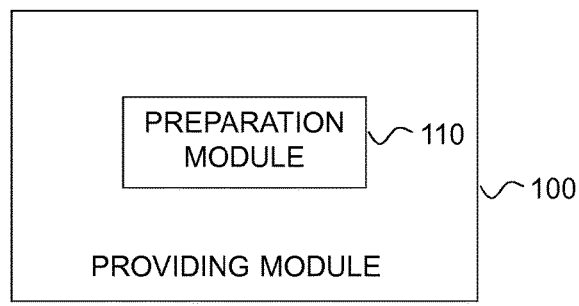
FIG. 12 is a schematic block diagram illustrating an example of the providing module of FIG. 11 according to an embodiment.

FIG. 12 is a schematic block diagram illustrating a particular example of the providing module 100 of FIG. 11 according to an embodiment. In this example, the providing module 100 comprises a preparation module 110 for preparing the at least one pair of information elements for transfer to a second network node.

Figure 13:
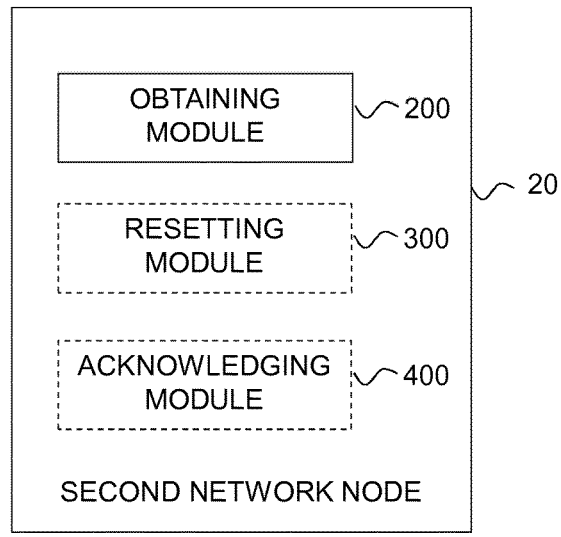
FIG. 13 is a schematic block diagram illustrating an example of a second network node for enabling resetting of network resources in a wireless network according to an alternative embodiment.

FIG. 13 is a schematic block diagram illustrating an example of a second network node 20 for enabling resetting of network resources in a wireless network according to an embodiment. In this example, the second network node 20 comprises an obtaining module 200 for obtaining at least one pair of information elements, each pair defining a respective range of identifiers within a list of identifiers, wherein each identifier within each range of identifiers is associated with a respective network resource to be reset.

As a particular example, illustrated with dashed lines in FIG. 13, the second network node 20 further comprises a resetting module 300 for resetting each network resource associated with a respective identifier within each range of identifiers defined by a respective received pair of information elements.

As a further example, also illustrated with dashed lines in FIG. 13, the second network node 20 further comprises an acknowledging module 400 for acknowledging that the at least one pair of information elements has been received.

In an example embodiment, the acknowledging module 400 generates an acknowledgement message and prepares the acknowledgment message for transfer to a first network node.

Figure 14:
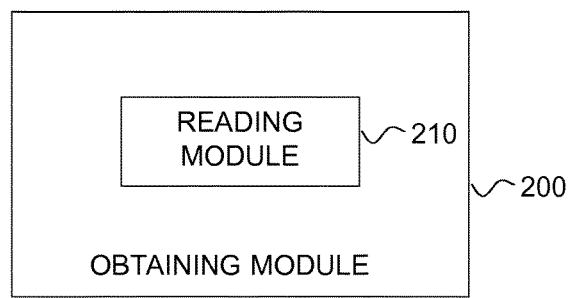
FIG. 14 is a schematic block diagram illustrating an example of the obtaining module of FIG. 13 according to an embodiment.

FIG. 14 is a schematic block diagram illustrating a particular example of the obtaining module 200 of FIG. 13 according to an embodiment. In this example, and in particular from the perspective of the processor, the obtaining module 200 comprises a reading module 210 for reading the at least one pair of information elements.

In one embodiment the network interfaces mentioned above refer to interfaces in the control plane, in particular between the Radio Access Network, RAN, and the Core Network, CN. In an example implementation, for a 3G network, the network interface corresponds to the Iu interface between the Radio Network Controller, RNC, and the CN. For a GSM network this would correspond to the A interface between the Mobile Switching Center (MSC) and the Base Station Controller (BSC).

When using the word "comprise" or "comprising" it shall be interpreted as non-limiting, i.e. meaning "consist at least of".

As used herein, the term User Equipment, UE, should be interpreted as a non-limiting term comprising any type of wireless device communicating with a radio network node in a cellular or mobile communication system or any device equipped with radio circuitry for wireless communication according to any relevant standard for communication within a cellular or mobile communication system. Often the term wireless device is used equivalently to the term UE. For example, the term UE may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like.

As used herein, the non-limiting term "network node" may refer to base stations, network control nodes such as network controllers, radio network controllers, base station controllers, and the like, as well as to wireless devices such as exemplified above. In particular, the term "base station" may encompass different types of radio base stations including standardized base stations such as Node Bs, or evolved Node Bs, (eNodeBs), and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described above.

The processing circuitry does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3$^{rd}$ Generation Partnership Project (3GPP) Technical Specification (TS) 25.413 (chapter 9.1.44).

The invention claimed is:

1. A method performed by a first network node for enabling resetting of network resources in a wireless network, wherein said method comprises:
   providing at least one pair of information elements, each pair defining a respective range of identifiers within a list of identifiers, wherein each identifier within each range of identifiers is associated with a respective network resource to be reset, and wherein said information elements correspond to standardized Information Elements (IEs), provided in a Radio Access Network Application Part (RANAP) message RESET RESOURCE within a RANAP Reset Resource procedure; and
   wherein one information element of a pair of information elements indicates a starting point of the respective range of identifiers within the list of identifiers, and the other information element of the same pair of information elements indicates an end point of the same range of identifiers.

2. The method according to claim 1, wherein one information element of a second pair of information elements indicates a starting point or an end point of a range of identifiers within a list of identifiers, and the other information element of the same pair of information elements indicates a length of the same range of identifiers.

3. The method according to claim 1, wherein said providing at least one pair of information elements comprises preparing said at least one pair of information elements for transfer to a second network node, and sending said at least one pair of information elements to said second network node.

4. The method according to claim 3, wherein the first network node is a Radio Network Controller, RNC, and the second network node is a Core Network node, CN node.

5. The method according to claim 3, wherein the first network node is a Core Network node, CN node, and the second network node is a Radio Network Controller, RNC.

6. A method performed by a second network node for enabling resetting of network resources in a wireless network, wherein said method comprises:
   receiving at least one pair of information elements, each pair defining a respective range of identifiers within a list of identifiers, wherein each identifier within each range of identifiers is associated with a respective network resource to be reset, and wherein said information elements correspond to standardized Information Elements (IEs), provided in a Radio Access Network Application Part (RANAP) message RESET RESOURCE within a RANAP Reset Resource procedure; and
   wherein one information element of a pair of information elements indicates a starting point of the respective range of identifiers within the list of identifiers, and the other information element of the same pair of information elements indicates an end point of the same range of identifiers.

7. The method according to claim 6, wherein said method further comprises resetting each network resource associated with a respective identifier within each range of identifiers defined by a respective received pair of information elements.

8. The method according to claim 6, wherein said method further comprises acknowledging that the at least one pair of information elements has been received.

9. The method according to claim 8, wherein said acknowledging that the at least one pair of information elements has been received comprises sending a Radio Access Network Application Part, RANAP, message to the first network node.

10. The method according to claim 9, wherein said acknowledging that the at least one pair of information elements has been received comprises the step of sending a RESET RESOURCE ACKNOWLEDGE message within a RANAP Reset Resource Acknowledge procedure to the first network node.

11. A first network node configured to enable resetting of network resources in a wireless network, said first network node comprising:
 a memory; and
 a processor configured to execute program instructions stored in the memory, whereby said first network node is operative to:
  provide at least one pair of information elements, each pair defining a respective range of identifiers within a list of identifiers, wherein each identifier within each range of identifiers is associated with a respective network resource to be reset, and wherein said information elements correspond to standardized Information Elements (IEs), provided in a Radio Access Network Application Part (RANAP) message RESET RESOURCE within a RANAP Reset Resource procedure; and
  wherein one information element of a pair of information elements indicates a starting point of the respective range of identifiers within the list of identifiers, and the other information element of the same pair of information elements indicates an end point of the same range of identifiers.

12. The first network node of claim 11, wherein one information element of a second pair of information elements indicates a starting point or and end point of a range of identifiers within a list of identifiers, and the other information element of the same pair of information elements indicates a length of the same range of identifiers.

13. The first network node of claim 11, wherein the first network node is configured to prepare said at least one pair of information elements for transfer to a second network node, and to send said at least one pair of information elements to said second network node.

14. The first network node of claim 11, wherein the first network node is one of the following:
 a Radio Network Controller, RNC; and
 a Core Network node, CN node.

15. A second network node configured to enable resetting of network resources in a wireless network, the second network node comprising:
 a memory; and
 a processor configured to execute program instructions stored in the memory, whereby said second network node operative to:
  receive at least one pair of information elements, each pair defining a respective range of identifiers within a list of identifiers, wherein each identifier within each range of identifiers is associated with a respective network resource to be reset, and wherein said information elements correspond to standardized Information Elements (IEs), provided in a Radio Access Network Application Part (RANAP) message RESET RESOURCE within a RANAP Reset Resource procedure; and
  wherein one information element of a pair of information elements indicates a starting point of the respective range of identifiers within the list of identifiers, and the other information element of the same pair of information elements indicates an end point of the same range of identifiers.

16. The second network node of claim 15, wherein the second network node is further configured to reset each network resource associated with a respective identifier within each range of identifiers defined by a respective received pair of information elements.

17. The second network node of claim 15, wherein the second network node is further configured to acknowledge that the at least one pair of information elements has been received.

18. The second network node of claim 17, wherein the second network node is configured to send a Radio Access Network Application Part, RANAP, message to the first network node, to acknowledge that the at least one pair of information elements has been received.

19. The second network node of claim 18, wherein the second network node is configured to send a RESET RESOURCE ACKNOWLEDGE message within a RANAP Reset Resource Acknowledge procedure to the first network node, to acknowledge that the at least one pair of information elements has been received.

20. The second network node of claim 15, wherein the second network node is one of the following:
 a Core Network node, CN node; and
 a Radio Network Controller, RNC.

21. A non-transitory computer-readable medium encoded with program instructions, which when executed by at least one processor, cause the one or more processors to:
 provide at least one pair of information elements, each pair defining a respective range of identifiers within a list of identifiers, wherein each identifier within each range of identifiers is associated with a respective network resource to be reset, and wherein said information elements correspond to standardized Information Elements (IEs), provided in a Radio Access Network Application Part (RANAP) message RESET RESOURCE within a RANAP Reset Resource procedure; and
 wherein one information element of a pair of information elements indicates a starting point of the respective range of identifiers within the list of identifiers, and the other information element of the same pair of information elements indicates an end point of the same range of identifiers.

22. A non-transitory computer-readable medium encoded with program instructions, which when executed by at least one processor, cause the one or more processors to:
 obtain at least one pair of information elements, each pair defining a respective range of identifiers within a list of identifiers, wherein each identifier within each range of identifiers is associated with a respective network resource to be reset, and wherein said information elements correspond to standardized Information Elements (IEs), provided in a Radio Access Network Application Part (RANAP) message RESET RESOURCE within a RANAP Reset Resource procedure; and wherein one information element of a pair of information elements indicates a starting point of the respective range of identifiers within the list of identifiers, and the other information element of the same pair of information elements indicates an end point of the same range of identifiers.

* * * * *

UNITED STATES PATENT AND TRADEMARK OFFICE
CERTIFICATE OF CORRECTION

PATENT NO. : 9,706,584 B2
APPLICATION NO. : 14/420938
DATED : July 11, 2017
INVENTOR(S) : Shi et al.

Page 1 of 1

It is certified that error appears in the above-identified patent and that said Letters Patent is hereby corrected as shown below:

In Column 1, Lines 31-32, delete "Node B's," and insert -- Node Bs, --, therefor In Column 2, Line 59, delete "Equipment" and insert -- Equipments --, therefor.

In Column 5, Line 49, delete "Equipment" and insert -- Equipments --, therefor.

In Column 6, Line 35, delete "and end" and insert -- an end --, therefor.

In Column 7, Line 53, delete "second network 20" and insert -- second network node 20 --, therefor.

In Column 10, Line 64, delete "RNCE" and insert -- RNC --, therefor.

In Column 13, Line 3, delete "and end" and insert -- an end --, therefor.

In Column 13, Line 54, delete "node" and insert -- node 10 --, therefor.

In Column 15, Line 39, delete "Blueray" and insert -- Bluray --, therefor.

In Column 19, Line 45, in Claim 12, delete "and end" and insert -- an end --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*